(12) United States Patent
Veshchikov

(10) Patent No.: US 12,021,893 B2
(45) Date of Patent: Jun. 25, 2024

(54) METHOD FOR PARTITIONING A PLURALITY OF DEVICES IN A COMMUNICATIONS SYSTEM AND A DEVICE THEREFOR

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 189 days.

(21) Appl. No.: 17/303,906

(22) Filed: Jun. 10, 2021

(65) Prior Publication Data

US 2022/0400120 A1    Dec. 15, 2022

(51) Int. Cl.
*H04L 9/40* (2022.01)

(52) U.S. Cl.
CPC .......... *H04L 63/145* (2013.01); *H04L 63/104* (2013.01); *H04L 63/108* (2013.01); *H04L 63/1416* (2013.01); *H04L 63/1425* (2013.01)

(58) Field of Classification Search
CPC ... H04L 63/145; H04L 63/104; H04L 63/108; H04L 63/1425; H04L 63/1416
See application file for complete search history.

(56) References Cited

U.S. PATENT DOCUMENTS

| | | | |
|---|---|---|---|
| 7,697,536 B2 | 4/2010 | Basso et al. | |
| 7,805,726 B1 | 9/2010 | Leonard et al. | |
| 7,991,850 B2 | 8/2011 | Lavin et al. | |
| 9,495,535 B2 | 11/2016 | Suryanarayana et al. | |
| 10,117,137 B2 | 10/2018 | Rommer et al. | |

(Continued)

FOREIGN PATENT DOCUMENTS

| | | |
|---|---|---|
| CN | 108989091 A | 12/2018 |
| CN | 109474627 A | 3/2019 |
| WO | 2018010811 A1 | 1/2018 |

OTHER PUBLICATIONS

Ergen, Sinem Coleri, et al.; "TDMA Scheduling Algorithms for Wireless Sensor Networks"; Wireless Network 16, Published Online May 27, 2009; Published 2010; https://doi.org/10.1007/s11276-009-0183-0; https://www.cs.odu.edu/~cs752/papers/tdmaschedule.pdf.

(Continued)

*Primary Examiner* — Farid Homayounmehr
*Assistant Examiner* — Mudasiru K Olaegbe
(74) *Attorney, Agent, or Firm* — Daniel D. Hill

(57) ABSTRACT

A method is provided for partitioning a plurality of devices in a communications system. The method includes providing the communications system with a central server that communicates with each of the plurality of devices. The communications system communicates in a plurality of time periods. The plurality of devices is partitioned into two or more groups of devices. Time periods of the plurality of time periods are assigned for communications of the two or more groups of devices. Time intervals between the time periods for the two or more groups are determined to be co-prime time intervals greater than one, and each of the two or more groups is assigned a different time interval of the co-prime time intervals. The two or more groups are active for communications only during the assigned time periods determined by the co-prime time intervals. A device is also provided for operating in the communications system.

20 Claims, 6 Drawing Sheets

(56) References Cited

U.S. PATENT DOCUMENTS

| | | | |
|---|---|---|---|
| 10,299,199 B2 | 5/2019 | Basilier et al. | |
| 10,616,764 B2 | 4/2020 | Rommer et al. | |
| 2002/0194490 A1* | 12/2002 | Halperin | G06F 21/554 709/224 |
| 2003/0105973 A1* | 6/2003 | Liang | H04L 63/1408 726/24 |
| 2009/0316811 A1* | 12/2009 | Maeda | H04W 76/11 375/260 |
| 2016/0358722 A1* | 12/2016 | Lakshmanan | G05F 1/66 |
| 2017/0155669 A1* | 6/2017 | Sudo | H04L 63/101 |
| 2018/0167973 A1* | 6/2018 | Jeong | H04W 72/044 |
| 2018/0176914 A1* | 6/2018 | Hagihara | H04W 52/0216 |
| 2019/0349392 A1* | 11/2019 | Wetterwald | H04L 43/0852 |
| 2021/0051177 A1* | 2/2021 | White | H04L 67/56 |
| 2022/0039134 A1* | 2/2022 | Fong | H04W 72/1263 |

OTHER PUBLICATIONS ip.com; "Strategies for Efficient Use of Resources for Regular Information Transfers From a Swarm of Devices to Central Servers"; IPCOM000254108D; Publication Date Jun. 1, 2018.

Watteyne T. et al.; Internet Engineering Task Force (IETF); Request for Comments: 7554; Using IEEE 802.15.4e 3 Time-Slotted Channel Hopping (TSCH) in the Internet of Things (IoT): Problem Statement; May 2015; https://tools.ietf.org/html/rfc7554.

* cited by examiner

| TIME INTERVAL | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| GROUP 1 | | | ACTIVE | | | ACTIVE | | | ACTIVE | | | ACTIVE | | | ACTIVE |
| GROUP 2 | | | | | ACTIVE | | | | | ACTIVE | | | | | ACTIVE |

ACTIVE DEVICE = ACTIVE
INACTIVE DEVICE = BLANK
TIME INTERVALS = 3 AND 5

FIG. 2

| TIME INTERVAL | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| GROUP 1 |  | A |  | A |  | A |  | A |  | A |  | A |  | A |  | A |  | A |  | A |  | A |  | A |  | A |  | A |  | A |
| GROUP 2 |  |  | A |  |  | A |  |  | A |  |  | A |  |  | A |  |  | A |  |  | A |  |  | A |  |  | A |  |  | A |
| GROUP 3 |  |  |  |  | A |  |  |  |  | A |  |  |  |  | A |  |  |  |  | A |  |  |  |  | A |  |  |  |  | A |

ACTIVE DEVICE = A

INACTIVE DEVICE = BLANK

TIME INTERVALS = 2, 3, AND 5

FIG. 3

METHOD FOR PARTITIONING A PLURALITY OF DEVICES IN A COMMUNICATIONS SYSTEM AND A DEVICE THEREFOR

BACKGROUND

Field

This disclosure relates generally to communications systems, and more particularly, to a method for partitioning a plurality of devices in a communications system and a device therefor.

Related Art

Networks or other systems that are composed of large numbers of devices are often partitioned into smaller groups or subnetworks. The partitions can be static or dynamic depending on the requirements of the system, that is, one device of the system can change its group membership. Partitioning can also be hierarchical where some devices have specific roles that are different from the roles of other devices. For example, some routers in a network are central nodes with each of the routers managing a particular subnetwork. Sometimes the networks or systems are partitioned according to the geographical position of each device.

Such networks or large groups of devices are partitioned for one or more various reasons. For example, using groups of devices that are similar in a particular way may ease management of the groups. Groups of devices may be partitioned to provide a reduction of complexity and load on a central server, e.g., each group may be handled by a separate smaller and dedicated server. Also, devices from different groups may have different security requirements or should not talk to each other, e.g., a group of devices may be in "quarantine" and may not be allowed to communicate with other devices. This is a more specific example of ease of management of cyber security of the system.

The devices may be identical or different, but nonetheless perform similar computations or provide similar services. For example, the devices could be smartphones, internet of things (IoT) devices, or connected devices. The same system can be applied to, for example, all smartphones that are running a specific application. In this case, the service provider would configure the application to use a particular technique.

Malware can be a big problem for many devices. Some malware may be dedicated for some specific type of devices that have similar hardware and run similar software and thus, have the same vulnerability that the malware can exploit. For example, the target devices can be laptops running the same version of the operating system, smartphones from a particular manufacturer, routers and other network equipment from the same vendor or smart speakers or other dedicated IoT devices.

Very often malware spreads from one device to another via the network, e.g. using Wi-Fi or Bluetooth. Therefore, an infected device must be able to communicate to allow the malware to propagate from it to other similar devices. Thus, if all devices targeted by the malware can talk to each other at any moment in time without restrictions it gives the malware the possibility of spreading quickly to all devices in the network.

Data capture and transmission can happen on regular intervals, for example, all the members of a group can become active at the same time to send captured data to one location, such as a central server. This would allow malware to infect all the devices of the transmitting group. This can also cause a very large instantaneous load on the system. One way to reduce the instantaneous load on the system is for the devices of an active group to offset transmit times so that they are not all transmitting at the same time. This would reduce the instantaneous load and also serve to slow the spread of any malware. However, this may limit communications such that some of the devices will never be active at the same time as some other devices.

Therefore, what is needed is a device and method than can reduce the instantaneous load on a system and reduce the speed that an anomaly, such as malware, can spread through the system to allow more time for protective action.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates a time interval table for two groups in accordance with an embodiment.

FIG. 3 illustrates a time interval table for three groups in accordance with another embodiment.

DETAILED DESCRIPTION

Figure 1:
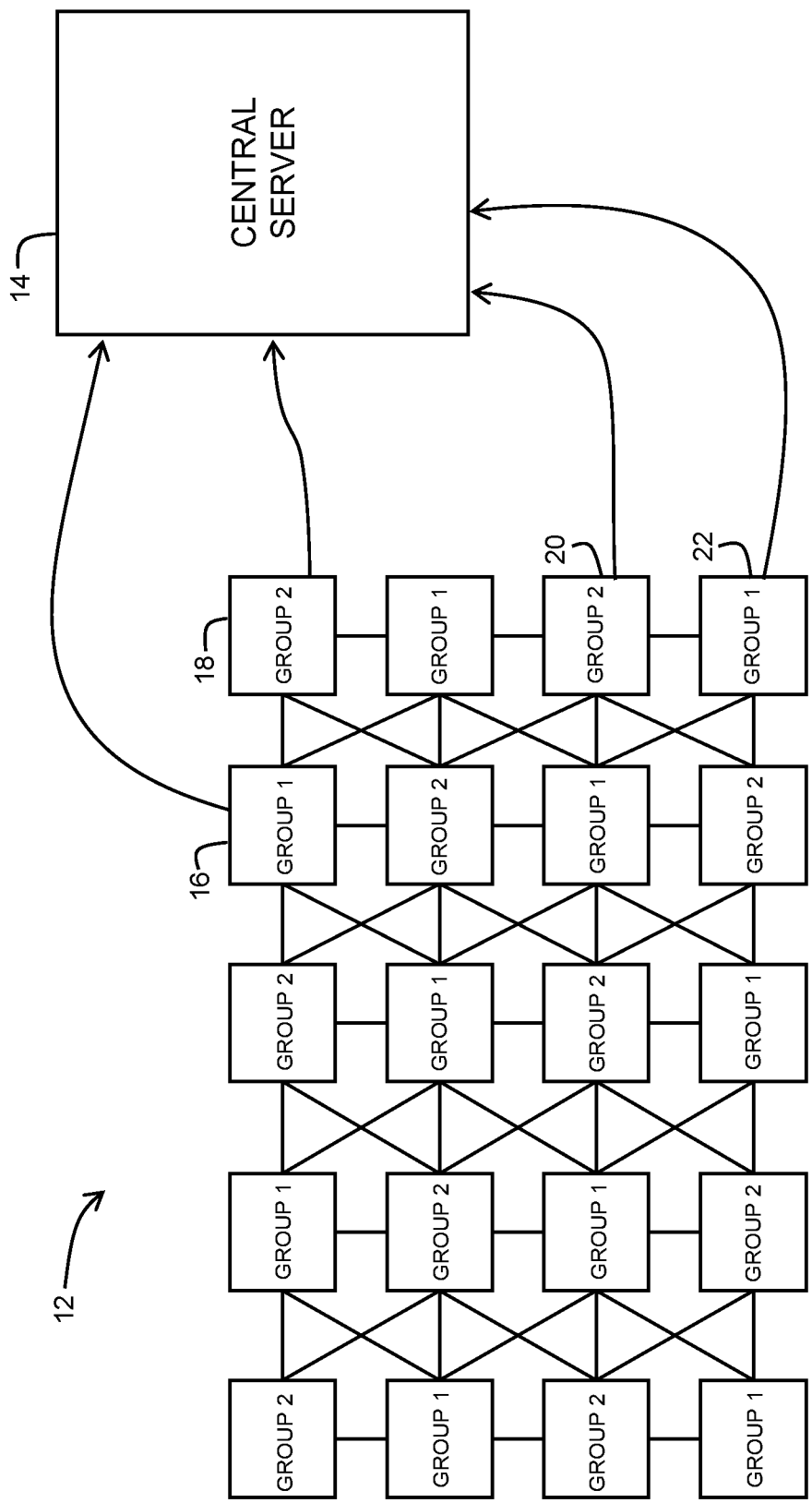
FIG. 1 illustrates a communications system having a plurality of devices organized into two groups in accordance with an embodiment.

Generally, there is provided, a method for partitioning a plurality of devices in a communications system. The method includes providing the communications system with a central server that communicates with each of the plurality of devices. The plurality devices are partitioned into two or more groups of devices based on a predefined criterion. Time periods for communications are assigned to the two or more groups of devices. Time intervals between the time periods for the two or more groups are determined to be co-prime time intervals greater than one. Each of the two or more groups is assigned a different time interval of the co-prime time intervals. The two or more groups can only be active for communications during the assigned time periods determined by the co-prime time intervals. Each of the two or more groups are inactive for communications at times other than the assigned time periods. Periodically, the co-prime time intervals allow all the plurality of devices to communicate at the same time.

Using the method described herein provides a communications system that reduces instantaneous load on the system by preventing all the groups from communicating at the same time. Also, the spread of an anomaly such as malware through the system is reduced because malware will only be able to spread at times when the devices are active for communications. Slowing the spread of malware gives the system more time to react to the problem and have a better chance of isolating the affected group of devices.

In accordance with an embodiment, there is provided, a method for partitioning a plurality of devices in a communications system, the method including: providing the communications system with a central server that communicates with each of the plurality of devices; providing the communications system with a plurality of time periods; partitioning the plurality of devices into two or more groups of devices; assigning time periods of the plurality of time periods for communications of the two or more groups of devices, wherein time intervals between the time periods for the two or more groups are determined to be co-prime time intervals greater than one, and wherein each of the two or more groups is assigned a different time interval of the co-prime time intervals; and allowing the two or more groups to be active for communications only during the assigned time periods determined by the co-prime time intervals, wherein each of the two or more groups are inactive for communications at times other than the assigned time periods. The plurality of devices may include sensors for capturing data and transmitting the data to the central server and to other devices of the plurality of devices. The co-prime time intervals may allow active communications only between members of a group of the two or more groups during a majority of the assigned time periods, and may allow active communications between members of all of the two or more groups during a minority of the assigned time periods. The plurality of devices communicates with each other and with the central server during the assigned time periods. The plurality of devices may communicate with each other using a wireless communications system. The method may further include: providing anomaly detection to the plurality of devices; determining that an anomaly has been detected in at least one member of the one or more groups; isolating the at least one member of the one or more groups; and starting a recovery procedure on the at least one member of the one or more groups. The plurality of devices may be smartphones.

In another embodiment, there is provided, a method including: providing a communications system with a central server that communicates with each of a plurality of devices; providing the communications system with a plurality of time periods; partitioning the plurality of devices into two or more groups of devices; assigning time periods for communications to the two or more groups of devices, wherein time intervals between the time periods for the two or more groups are determined to be co-prime time intervals greater than one, wherein each of the two or more groups is assigned a different time interval of the co-prime time intervals; allowing the two or more groups to be active for communications during the assigned time periods determined by the co-prime time intervals, wherein each of the two or more groups are inactive for communications at times other than the assigned time periods; monitoring the plurality of devices for anomalies; determining that at least one of the plurality of devices is affected by an anomaly; and preventing one of more devices affected by the anomaly from being active for communications during the assigned co-prime time intervals. The plurality of devices may include sensors for capturing data and transmitting the data to the central server and to other devices of the plurality of devices. The co-prime time intervals may allow active communications only between members of a group of the two or more groups during a majority of the assigned time periods, and may allow active communications between members of all the two or more groups during a minority of the assigned time periods. The plurality of devices may communicate with each other and with the central server during the assigned time periods. The plurality of devices may communicate with each other using a wireless communications system.

In yet another embodiment, there is provided, a device including: a processor coupled to a sensor for sensing and capturing data; a networking circuit for facilitating communications of the captured data with a plurality of devices, wherein the plurality of devices is partitioned into two or more groups of devices; and a time synchronization circuit coupled to the networking circuit for synchronizing time periods for communicating the captured data with the central server, wherein time intervals between the time periods for the two or more groups are determined to be co-prime time intervals greater than one, and wherein each of the two or more groups is assigned a different time interval of the co-prime time intervals for communicating the captured data. The time periods may be synchronized using a network time protocol. The device may further include an anomaly detection circuit coupled to the networking circuit for detecting an anomaly in the device. A detected anomaly may be malware. The device may further include a networking circuit to prevent the malware from spreading to other devices of the plurality of devices. The co-prime time intervals may allow active communications only between members of a group of the two or more groups during a majority of the assigned time periods, and may allow active communications between members of all of the two or more groups during a minority of the assigned time periods. Each of the plurality of devices may communicate using a wireless communications system. The device may be a smartphone.

FIG. 1 illustrates a communications system 10 in accordance with an embodiment. Communications system 10 includes a plurality of devices 12 organized into two groups and central server 14. Plurality of devices 12 is organized into a first group labeled "GROUP 1" and a second group labeled "GROUP 2." In one embodiment, all the devices of the groups are interconnected with each other and can actively communicate with other members of plurality of groups 12. Also, selected devices of the groups are connected to directly communicate with central server 14. For example, GROUP 1 device 16, GROUP 2 device 18, GROUP 2 device 20, and GROUP 1 device 22 are connected to communicate directly with central server 14. In FIG. 1, plurality of devices 12 is divided equally between the two groups. The plurality of devices 12 can be divided differently in other embodiments. As noted above, large groups of similar devices may be separated into groups for ease of management. Separation can be physical or virtual. The separation can be based on function, physical location, type of device or type of user. In accordance with the described embodiment, networking or other activity requiring communication between plurality of devices 12, such as sharing a resource, is separated in time between the two groups of devices using active time periods and inactive time periods.

FIG. 2 illustrates a time interval table for two groups in accordance with an embodiment. The two groups are labeled GROUP 1 and GROUP 2 and may be the two groups of the plurality of devices in FIG. 1 or some other plurality of devices. The table of FIG. 2 shows 15 time periods across the top row. The time intervals for active communications between the devices are chosen to be co-prime time intervals greater than one. For example, for purposes of illustration, the time intervals are 3 and 5 in FIG. 2. The time intervals determine which time periods GROUP 1 and GROUP 2 are active for communications. In FIG. 2, the active time periods for each group are marked "ACTIVE." The inactive time periods are blank. Each group of devices is assigned a different time interval. For example, as can be seen in FIG. 2, the time interval for active communication is 3 time periods for GROUP 1 and 5 time periods for GROUP 2. That is, every 3 time periods, members of GROUP 1 are active and every 5 time periods, members of GROUP 2 are active. Every 15 time periods the devices of GROUP 1 and GROUP 2 are active at the same time. This means that most of the time, GROUP 1 devices are not active at the same time GROUP 2 devices are active. Limiting how often all the plurality of devices 12 are active at the same time reduces the instantaneous load on the system. Also, when devices of a group are not active, the devices will not be able to communicate with each other. The devices will not receive any messages, including any malicious messages containing malware. Therefore, malware will only be able to spread across the devices from different groups when the groups are active. The embodiment described in FIG. 2 limits when the groups are active at the same time, thus limiting the spread of a malware across the devices.

The time intervals of the different groups can be adjusted to cause the devices to be active and communicate with each other more or less often. If all the devices in each group are distributed uniformly through the space that has to be monitored, the communications system can get synchronized measurements of the multiple groups of monitored devices at larger regular intervals to allow better monitoring.

It is not always possible to reduce the number of the active communications of a plurality of devices as shown in FIG. 2. For example, it may be important to perform simultaneous actions among the devices. For example, it may be important for many devices to wake up on regular intervals at the same time, measure some properties, communicate the properties to, e.g., each other or a central server, and then go back to sleep. If all the devices are active at the same time, as shown at period 15 of FIG. 2, they can communicate using the entire network. This also means a malware can also propagate through the entire network during the activity interval. When appropriate, the use of the co-prime time intervals allow active communications only between members of a group of the two or more groups during a majority of the assigned time periods, and allow active communications between members of all of the two or more groups during a minority of the assigned time periods.

Anomalies such as malware can be a problem for many systems, especially systems connected to a network such as the internet. In a first scenario involving a relatively strong malware, the malware may be able to take full control of an infected device and can disable a circuit on the device that enforces the active/inactive intervals. Once disabled, the malware can force the infected device to become active and send malicious messages at any moment in time. In a second scenario involving a relatively weaker malware, the malware can take control of the device but not of the circuit that enforces activity intervals, so the malware can only communicate during the active intervals. In the second scenario, the relatively weaker malware will not be able to spread from the originally infected group of devices to other groups.

In the first scenario, the malware may be able to infect devices from other groups but the malware would have to guess the active intervals of other devices or it would have to send malicious messages all the time hoping to hit the active interval of other groups. Such behavior of the malware may lead to easier detection due to the extra activity on the network and additional larger processor load. However, using the co-prime communications intervals as shown in FIG. 2, the malware will need more time to infect devices from other groups compared to a situation when all devices can communicate at any moment in time. Overall, the relatively stronger malware would have to guess at the active intervals or transmit continuously to successfully spread the malware, and thus will likely be detected faster.

In the example of FIG. 2, both groups can communicate to a central server, such as for example, the central server 14 in FIG. 1, and the devices can communicate with each other, including communicating with members of other groups at longer intervals. If any device from GROUP 1 is infected with the relatively weaker malware, the infected device will only be able to attack other devices from GROUP 1 except during every fifteenth time period when the relatively weaker malware will be able to spread to GROUP 2. A relatively stronger malware can spread faster as discussed above. Note that if the periods were not co-prime as shown in FIG. 2, the two groups may be active at the same time more often. For example, if the time interval for GROUP 1 was 3 and the time interval for GROUP 2 was 6, both groups would be active simultaneously every sixth time period instead of only every fifteenth time period. That means the system and the central server will see a high instantaneous load more often and a malware will have more frequent chances to spread from one group of devices to another group.

FIG. 3 illustrates a time interval table for three groups in accordance with another embodiment. The three groups are labeled GROUP 1, GROUP 2, and GROUP 3. The table of FIG. 3 shows 30 time periods across the top row. As discussed above for FIG. 2, the time intervals for active communications between the devices are chosen to be co-prime. The active time periods for each group are marked with an "A". The inactive time periods for the groups are blank. Each group of devices is assigned a different time interval. For example, as can be seen in FIG. 3, the time interval for active communication is 2 time periods for GROUP 1, 3 time periods for GROUP 2, and 5 time periods for GROUP 3. That is, every 2 time periods, members of GROUP 1 are active, every 3 time periods members of GROUP 2 are active, and every 5 time periods, members of GROUP 3 are active. Every 30 time periods the devices of GROUP 1, GROUP 2, and GROUP 3 are active at the same time. This means that most of the time, the devices of different groups are not active at the same time. The time intervals of the different groups can be adjusted to cause the devices to be active, e.g., communicate with each other more or less often. If all the devices in each group are distributed uniformly through the space that has to be monitored, the communications system can get synchronized measurements of the multiple groups of monitored devices at larger regular intervals to allow better monitoring. The embodiment of FIG. 3 provides the same advantages for three groups regarding resistance to malware and reduced instantaneous load as discussed above for the two groups of FIG. 2.

Figure 4:
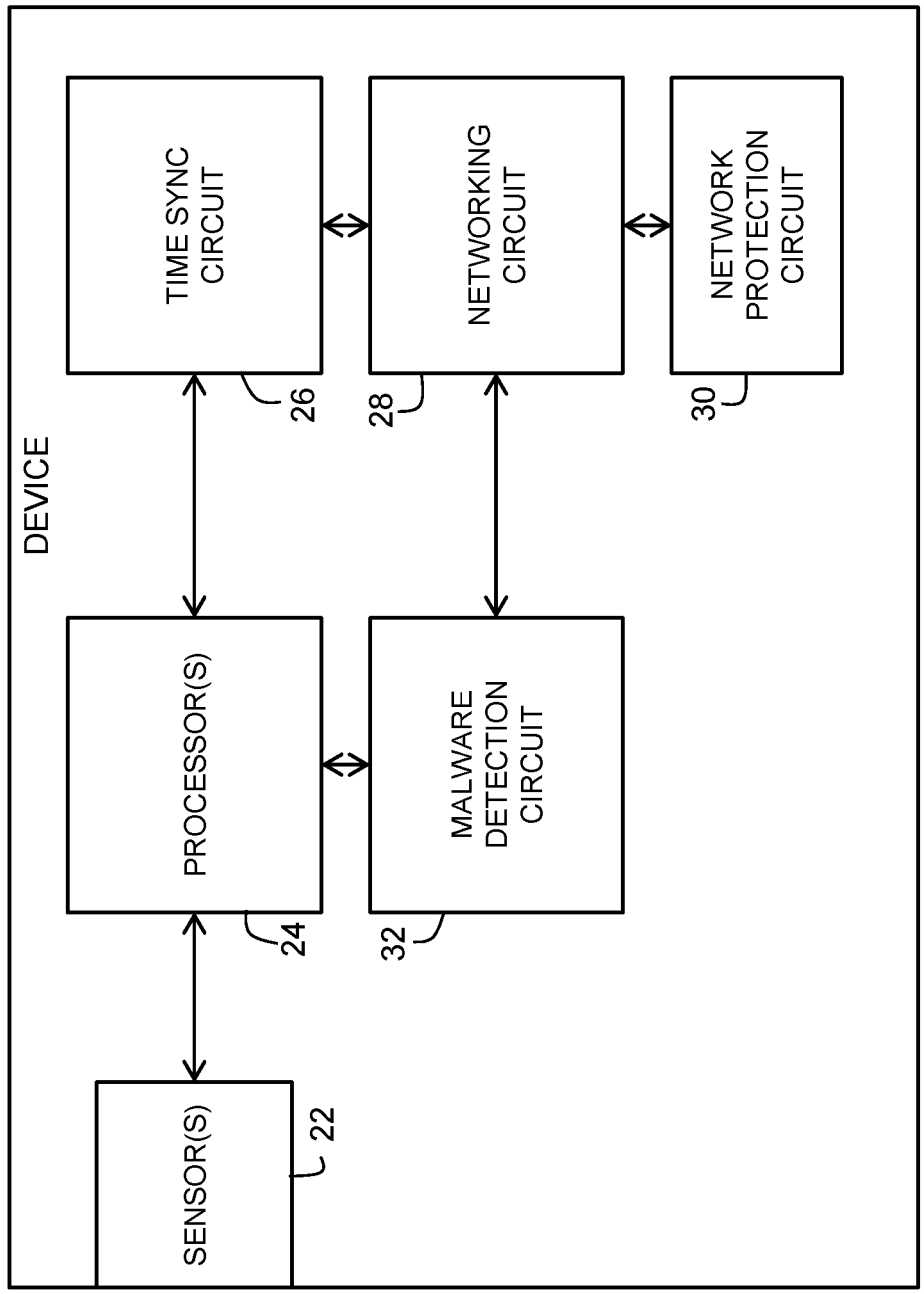
FIG. 4 illustrates a device in accordance with an embodiment.

FIG. 4 illustrates a simplified device 20 in accordance with an embodiment. In one embodiment, device 20 may be implemented on one or more integrated circuits. The device may be a smartphone or other communications device. Device 20 includes sensors 22, one or more processors 24, time synchronization circuit 26, networking circuit 28, network protection circuit 30, and malware detection circuit 32. All the devices of a plurality of devices would have the same or similar circuits in order to communicate with each other. Also, other embodiments may have additional circuit blocks or functionality not illustrated in FIG. 4.

One or more processors 24 may include any hardware device capable of executing instructions stored in memory (not shown). For example, processor(s) 24 may execute applications related to functionality provided by device 20. Processor(s) 24 may be, for example, a microprocessor, field programmable gate array (FPGA), application-specific integrated circuit (ASIC), or similar device. Processor(s) 24 may include multiple processor cores. Processor 24 may be implemented in a secure hardware element and may be tamper resistant.

One or more sensors 22 are connected to processor(s) 24. Sensors 22 can sense and capture data and send the data to other devices and/or to a central server. Sensors 22 can be any type of sensor, such as a temperature sensor or sensors used for, e.g., soil samples, nature studies, and weather conditions. An array or group of devices having sensors 22 may be deployed in a wilderness area and can be within 2 or 3 meters of each other or miles apart. The sensors may communicate with each other using various communication protocols such as Wi-Fi or Zigbee. Data capture and transmission from the sensors may happen on a regular interval, such as the intervals illustrated in FIG. 2 or FIG. 3 using co-prime intervals for groups of devices. The transmission may be with other devices of the system or with a central server. The time interval may be chosen to conserve battery life in applications where the devices are left unattended for long periods of time.

Time synchronization circuit 26 provides device 20 with the ability to synchronize active time periods of its corresponding group with a central server, such as for example, central server 14 in FIG. 1. Any existing time synchronization protocol may be used or adapted for use, such as a network time protocol (NTP) or simple network time protocol (SNTP).

Networking circuit 28 may include one or more circuits for enabling communication with other hardware devices. For example, network circuit 28 may include, or be coupled to, a network interface card (NIC) configured to communicate according to the Ethernet protocol. Also, network interface 72 may implement a TCP/IP stack for communication according to the TCP/IP protocols. In addition, the devices may be devices such as smartphones communicating over a cellular system or may be other devices that communicate via one or more wireless protocols such as Wi-Fi or Bluetooth. Data samples for transmission may be transmitted using network interface 72, or a similar interface. Various other hardware or software configurations for communicating are available. Networking circuit 28 receives a time synchronization signal from time synchronization circuit 26 to set the time interval of communication with the other devices in the communication system and with the central server.

Malware detection circuit 32 is connected to processor(s) 24 and to networking circuit 28. Malware detection circuit 32 is configured to detect an attack upon device 20. When malware is detected, an indication is provided to networking circuit 28. Network protection circuit 30 is connected to networking circuit 28 to prevent device 20 from communicating with other devices using the network such as when malware is detected. This is done to prevent the malware from spreading to other devices as discussed above. Network protection circuit 30 may be implemented using software, hardware, or a combination of hardware and software. Network protection circuit 30 may also be designed to resist disablement. Network protection circuit 30 can be implemented using, for example, a hypervisor that would control access to the networking circuit 28. However, hardware assisted protection may provide better security of the system.

Figure 5:
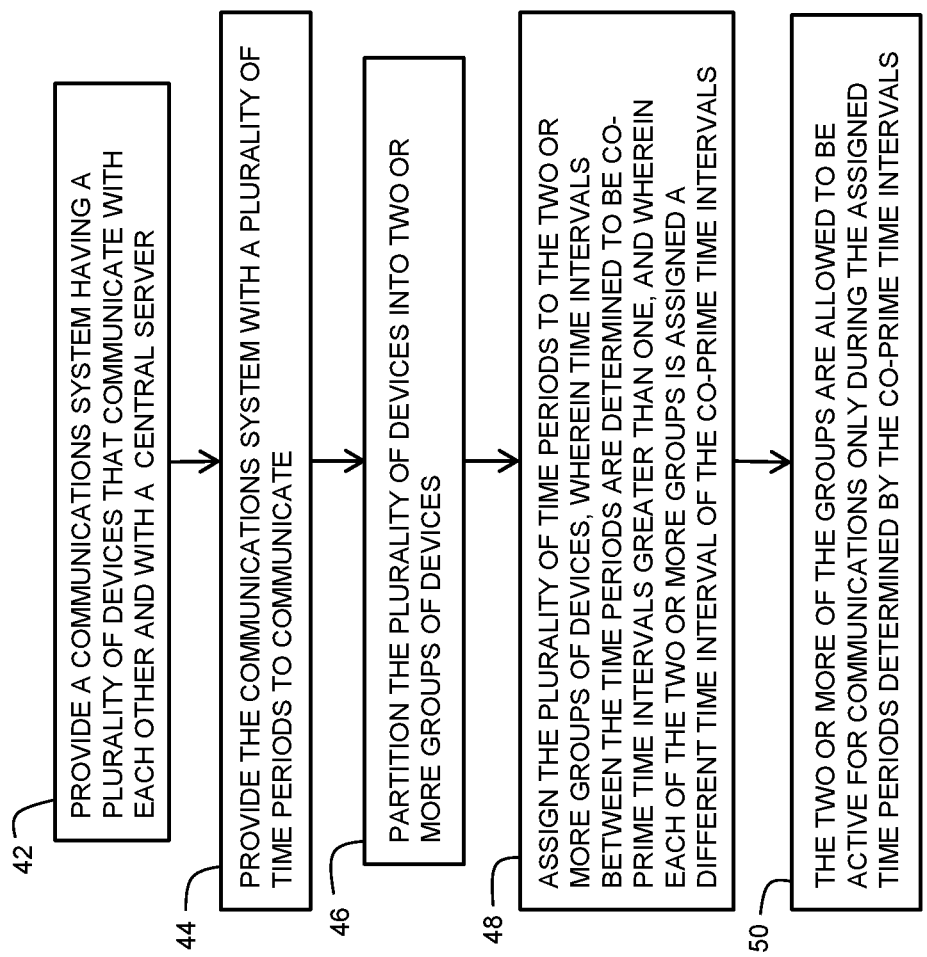
FIG. 5 illustrates a flowchart of a method for partitioning a plurality of devices in a communications system in accordance with an embodiment.

FIG. 5 illustrates a flowchart of method 40 for partitioning a plurality of devices in a communications system in accordance with an embodiment. Method 40 begins at step 42. At step 42, a communications system is provided having a plurality of devices that communicate with each other and with a central server. At step 44, the communications system is provided with a plurality of time periods in which to communicate. At step 46, the plurality of devices is partitioned into two or more groups of devices. At step 48, the plurality of time periods is assigned to the two or more groups of devices, wherein time intervals between the time periods are determined to be co-prime time intervals greater than one, and wherein each of the two or more groups is assigned a different time interval of the co-prime time intervals. At step 50, the two or more groups are allowed to be active for communications only during the assigned time periods determined by the co-prime time intervals. At all other times, the two or more groups are inactive for communications.

Figure 6:
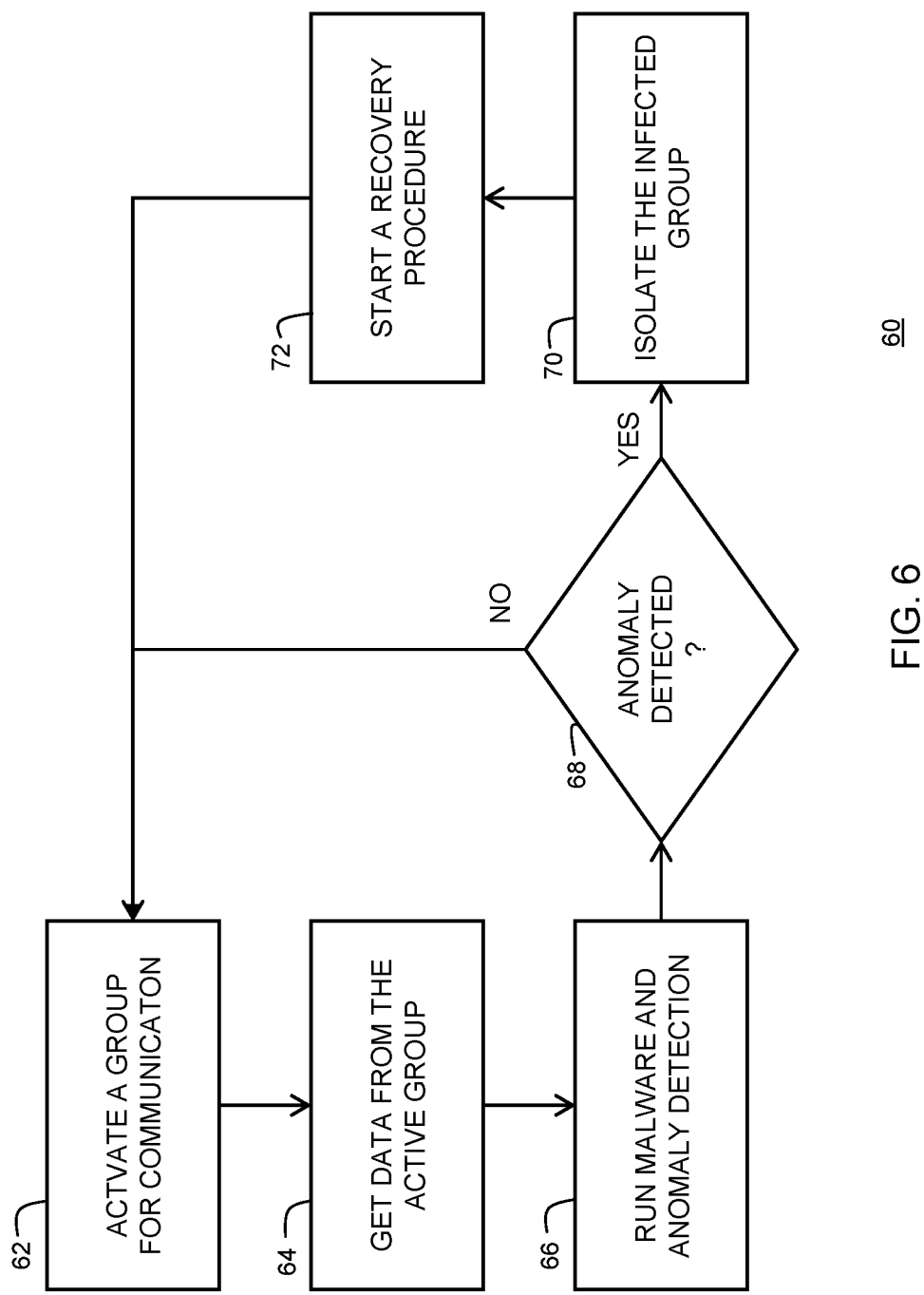
FIG. 6 illustrates a flowchart of a method for operating a communications system in accordance with an embodiment.

FIG. 6 illustrates a flowchart of method 60 for operating a communications system in accordance with an embodiment. The communications system includes a plurality of devices organized into multiple groups of devices as discussed above. Method 60 begins at step 62. At step 62, a group of devices are activated for communication with other devices or with a central server such as the central server of FIG. 1. At step 64, data is retrieved from the active group of devices. The data may be sensor data that has be captured over a period of time. At step 66, malware and anomaly detection functionality may be run on members of the group. The malware and anomaly detection may be performed using circuitry on each of the devices. At decision step 68, it is determined if an anomaly or malware is detected. If an anomaly or malware are not detected, the NO path is taken back to step 62. If an anomaly or malware is detected, the YES path is taken to step 70. At step 70, the group having the infected device(s) is/are isolated. A device may be isolated using a network protection circuit such as the network protection circuit 30 illustrated in FIG. 4. Also, the device or group of devices may be isolated by a central server if present in the communications system. To prevent the spread of the malware, all the devices of a group may be isolated or prevented from becoming active. Also, the central server may temporarily modify an active period of a group so that the group will not be active at the same time to prevent the other group from being exposed to the malware. At step 72, a recovery procedure may be started to remove or contain the malware or anomaly. Method 60 may then return to step 62 and repeat. Monitoring for malware can continue even through some devices are infected to ensure the malware does not spread through the entire system.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for partitioning a plurality of devices in a communications system, the method comprising:
   providing the communications system with a central server that communicates with each of the plurality of devices;
   providing the communications system with a plurality of time periods;
   partitioning the plurality of devices into two or more groups of devices;
   assigning time periods of the plurality of time periods for communications of the two or more groups of devices, wherein devices of each group of the two or more groups of devices communicate during time periods separated by time intervals, wherein the time intervals between the time periods for the two or more groups are determined to be co-prime time intervals greater than one, and wherein each of the two or more groups is assigned a different time interval of the co-prime time intervals; and
   allowing the two or more groups to be active for communications only during the assigned time periods determined by the co-prime time intervals, wherein each of the two or more groups are inactive for communications at times other than the assigned time periods.

2. The method of claim 1, wherein the plurality of devices comprises sensors for capturing data and transmitting the data to the central server and to other devices of the plurality of devices.

3. The method of claim 1, wherein the co-prime time intervals allow active communications only between members of a group of the two or more groups during a majority of the assigned time periods, and allow active communications between members of all of the two or more groups during a minority of the assigned time periods.

4. The method of claim 1, wherein the plurality of devices communicates with each other and with the central server during the assigned time periods.

5. The method of claim 1, wherein the plurality of devices communicates with each using a wireless communications system.

6. The method of claim 1, further comprising:
   providing anomaly detection to the plurality of devices;
   determining that an anomaly has been detected in at least one member of the one or more groups;
   isolating the at least one member of the one or more groups; and
   starting a recovery procedure on the at least one member of the one or more groups.

7. The method of claim 1, wherein the plurality of devices are smartphones.

8. A method comprising:
   providing a communications system with a central server that communicates with each of a plurality of devices;
   providing the communications system with a plurality of time periods;
   partitioning the plurality of devices into two or more groups of devices;
   assigning time periods for communications to the two or more groups of devices, wherein each group of the two or more groups of devices communicate during time periods separated by time intervals, wherein the time intervals between the time periods for the two or more groups are determined to be co-prime time intervals greater than one, wherein each of the two or more groups is assigned a different time interval of the co-prime time intervals;
   allowing the two or more groups to be active for communications during the assigned time periods determined by the co-prime time intervals, wherein each of the two or more groups are inactive for communications at times other than the assigned time periods;
   monitoring the plurality of devices for anomalies;
   determining that at least one of the plurality of devices is affected by an anomaly; and
   preventing one of more devices affected by the anomaly from being active for communications during the assigned co-prime time intervals.

9. The method of claim 8, wherein the plurality of devices comprises sensors for capturing data and transmitting the data to the central server and to other devices of the plurality of devices.

10. The method of claim 8, wherein the co-prime time intervals allow active communications only between members of a group of the two or more groups during a majority of the assigned time periods, and allow active communications between members of all of the two or more groups during a minority of the assigned time periods.

11. The method of claim 8, wherein the plurality of devices communicates with each other and with the central server during the assigned time periods.

12. The method of claim 8, wherein the plurality of devices communicates with each using a wireless communications system.

13. A device comprising:
   a processor coupled to a sensor for sensing and capturing data;
   a networking circuit for facilitating communications of the captured data with a plurality of devices, wherein the plurality of devices is partitioned into two or more groups of devices; and
   a time synchronization circuit coupled to the networking circuit for synchronizing time periods for communicating the captured data with the central server, wherein the networking circuit communicates with each group of the two or more groups of devices during time periods separated by time intervals, wherein the time intervals between the time periods for the communications are determined to be co-prime time intervals greater than one, and wherein the communications of the captured data with each of the two or more groups is assigned a different time interval of the co-prime time intervals.

14. The device of claim 13, wherein the time periods are synchronized using a network time protocol.

15. The device of claim 13, further comprising an anomaly detection circuit coupled to the networking circuit for detecting an anomaly in the device.

16. The device of claim 15, wherein a detected anomaly is malware.

17. The device of claim 16, further comprising a networking circuit to prevent the malware from spreading to other devices of the plurality of devices.

18. The device of claim 13, wherein the co-prime time intervals allow active communications only between members of a group of the two or more groups during a majority of the assigned time periods, and allow active communications between members of all of the two or more groups during a minority of the assigned time periods.

19. The device of claim 13, wherein each of the plurality of devices communicates using a wireless communications system.

20. The device of claim 13, wherein the device is a smartphone.

* * * * *